May 6, 1958 — H. F. REEVES, JR., ET AL — 2,833,729
GEL CATALYST PREPARATION
Filed Nov. 16, 1953
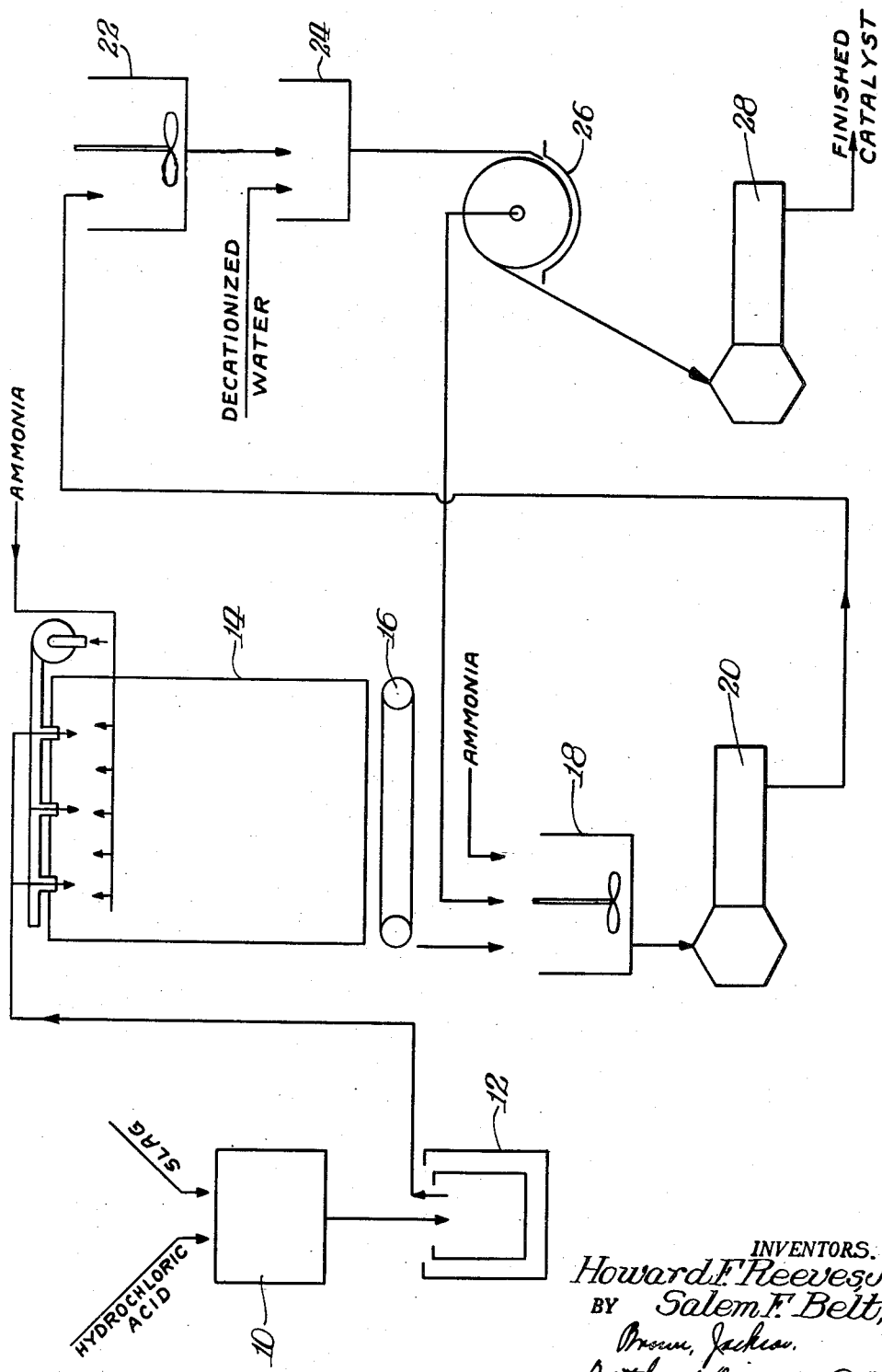
INVENTORS.
Howard F. Reeves, Jr.,
BY Salem F. Belt, United States Patent Office 2,833,729
Patented May 6, 1958

2,833,729

GEL CATALYST PREPARATION

Howard F. Reeves, Jr., Chattanooga, Tenn., and Salem F. Belt, North Texas City, Tex., assignors, by mesne assignments, to Morton Chemical Company, Chicago, Ill., a corporation of Delaware Application November 16, 1953, Serial No. 392,112

4 Claims. (Cl. 252—448)

This invention relates to an improvement in the manufacture of inorganic oxide gels and, more particularly, it relates to a method of preparing from furnace slags gels having the desired density for catalytic processes.

In the processes of catalytic cracking of virgin gas-oil, recycle distillates and distillate fractions, silica-alumina gels have had wide application as the catalytic contact material. And with the trend in catalytic cracking being toward fluidized processes in which the catalyst particles entrained in gaseous reactants move as a fluid through reactor and regenerator and connecting conduits, it can be seen that particle density of the catalyst, as it affects fluidization, is of extreme importance. Moreover, particle density in the degree that it represents physical porosity of the catalyst particle is of great importance in light of later studies in cracking catalysis which theorize that cracking and related reactions occur within the pores of the catalyst particles. Accordingly, a reduced particle density will be an important measure and indication of superior catalytic activity. As defined in Analytical Chemistry, vol. 23, No. 1, p. 152 (January 1951), particle density is the weight per unit of enveloped volume expressed as grams per cubic centimeter for the purpose of which definition a catalyst particle is visualized as surrounded individually by impervious envelopes.

In general, catalyst is mixed with the aforesaid virgin gas-oil, recycle distillate or distillate fraction at ratios of 5 to 30 pounds of catalyst per pound of material depending on specific conditions. On this basis, catalyst in amounts from 8 to 50 tons per minute pass through the processing units in a normal refinery running 15,000 barrels of crude per day. With the great degree of particle attrition due to the frictional flow forces, methods were perfected for producing a gel in spheroidal form which would be less susceptible to disintegration. A solution to this problem has not, however, covered the equally important problem in fluidization as it pertains to catalyst activity, regeneration and transportation, that problem being the regulation of particle density which for fluid techniques has been determined to be optimumly about 0.9 to 1.0.

It is therefore an object of this invention to provide a method for producing silica-alumina catalyst having a reduced particle density.

A further object is to provide a method for producing low-density silica-alumina gel in microspheroidal form from furnace slag which will not be unduly subject to attrition.

A further object is to provide a microspheroidal silica-alumina catalyst having a particle density of about 0.9 to 1.0 from furnace slag.

In preparing gels in spheroidal form a sol is prepared and dispersed as droplets into a congulating or gelling fluid which may be either a gaseous or liquid medium. For example, where a gaseous gelling medium is employed in accordance with the copending application, Serial No. 318,414, filed November 3, 1952, the spheroidal particles are collected on a belt on which they are allowed to age before being slurried to fix particle shape and particle density. After being aged and slurried, the particles are then introduced into a rotary filter which removes surface water before the particulate material is subjected to a partial drying, that drying being the step designated in the aforementioned application as pre-drying, which reduces the volatile content of the gel particle to about 30 to 45 percent, as determined by heating at 1800° F. It is thus evident that the process of this invention relating to the reduction of particle density is broadly described in said copending application wherein the concepts of this invention comprise the preliminary steps of hydrogel slurrying and pre-drying.

In producing silica-alumina gels various methods of reducing particle density have been studied. Among these methods was a diminution of aging time between the formation of the spheroids and the subsequent slurrying operation. A second attempt consisted of collecting the gel spheroids at the bottom of the spray column in water or weak alkaline earth metal salt solutions. Other methods included increasing the pH of the wash water or a treating of the washed spheres at an elevated pH before drying. Some of the prior art relied on incorporating an alcohol for a portion of the water in the gel prior to drying and other art altered the constituency of the catalyst by reducing the proportion of the heavier alumina component. However, none of these methods, singly or in combination, has given the desired degree of density reduction to produce a catalyst particle having a particle density of about 0.9 without in some way adversely affecting the physical or chemical properties of the catalytic particles.

Accordingly, we have now combined new concepts in slurrying and drying to obtain substantially unbroken microspheroidal gel particles of sufficiently low density. As shown in the accompanying drawing, furnace slag is charged with hydrochloric acid to reactor 10 wherein by cooling means the reaction of the slag with the acid is allowed to run its course at temperatures below 220° F. From such reaction a silica-alumina hydrosol is formed as a slurry having a pH of between 0.2 to 1.6 and optimumly from 0.7 to 1.1, which slurry is converted in centrifuge 12 to a clarified hydrosol.

From the centrifuge 12 the hydrosol enters the top of tower 14 to be sprayed continuously downward as droplets through an atmosphere of air and ammonia, the concentration of ammonia and residence time in the tower being such as to raise the pH of the original hydrosol and to convert it to hydrogel having a pH of about 3.2 to 4.8 with 3.5 to 4.1 being the preferred range for optimum gel formation. The hydrogel thus formed will have approximately the same chemical composition as the original hydrosol, except for the minor amount of ammonium salts resulting from the added ammonia.

The hydrogel in microspheroidal form as it falls through the ammoniated atmosphere is collected at the bottom of the tower 14 on a slowly moving belt 16 which allows time for the hydrogel to age before being slurried in an approximately equal weight of water having a sufficiently high pH, so as not to reduce the alumina content in the microspheroidal structure. No matter what the water source may be, it should be made moderately acidic so as to establish a pH in the slurry tank of from about 3.0 to 6.0. For this purpose, acids can be used, such as hydrochloric acid, which do not introduce such anions as would form insoluble salts with the hydrogel constituents. Since, as will be subsequently shown, particle density regulation, as taught by this invention, includes the control of salt concentration in the hydrogel, the acidic solution obtained from a subsequent step of gel dewatering is particularly suitable as a slurry medium if its pH is raised by dissolution of ammonia, for example, to a point where most of the alumina is retained within the microspheroidal structure. It is this particular embodiment of the invention diagrammed in the drawing showing wash water removed prior to final drying of the catalyst particles being returned from filter 26 to the system to act as a slurry medium in slurry tank 18.

For reasons to be explained, two important conditions to be specially regulated in the slurry tank 18 are hydrogen ion concentration and chloride ion concentration representing salt concentration. For wholly reliable results in catalyst preparation we have discovered that the pH in the slurry tank should be in the range of 4.3 to 4.8, although there is a workable range from 3.0 to 6.0 if the appearance of the final product is not critical. Above the preferred range of 4.3 to 4.8 some fragility of the particle structure with consequent breaking or shattering of the catalyst becomes noticeable. Below a pH of about 4.3 some aluminum hydroxide may be removed from the gel and lost to the solution.

With regard to controlling particle density by regulation of salt concentration in the hydrogel, the calcium and magnesium chlorides derived from the slag, and returned as stated above from filter 26 to the system in the slurry tank, are supplemented by the addition of ammonium chloride which is conveniently accomplished by absorbing anhydrous ammonia into the decationized water employed in the final washing of the catalyst particles in wash tank 24. Other similar water-soluble salts can be used in this slurry medium, but they must not contain interfering anions that would cause precipitation of insoluble compounds with those cations present as constituents of the original raw materials. As the same time, care must be taken to make sure that these added salts do not contain certain seemingly harmless cations which actually have inhibitory effects on catalytic activity or on properties of the petroleum products resulting from catalytic processing.

The following table illustrates the effect of the presence of various concentrations of chloride salts incorporated into the particle structure after gelling, the effect of these salts in regulating particle density being first noted during partial drying operations.

*Table I*

| Test Conditions | Gel Cl⁻ Titration (cc. 0.1 N AgNO₃/cc. of liquor) | Grams Cl⁻ per cc. of liquor | Cl⁻ as percent CaCl₂ in partially dried material | Finished product particle density |
| --- | --- | --- | --- | --- |
| Completely washed before drying | .07 | .002 | | 1.25–1.35 |
| Substantial part of Cl⁻ removed before drying | 13–14 | .048 | 37 | 1.16 |
| Part of Cl⁻ removed before drying | 22–23 | .080 | 47 | 1.00–1.05 |
| High Cl⁻ water used to slurry spheroids | 33–34 | .119 | 57 | .95 |
| All Cl⁻ present. Dried directly from spray column | 43 | .152 | 67 | .90 |

As was stated earlier, the effect on particle density attributable to salt content of the hydrogel only becomes evident after the gel has been subjected to the step of partial drying which will be subsequently discussed. It is sufficient to note that as the salt content of the gel is increased, the density of the dried particle is decreased. In this respect, the partial drying fixes the particle structure including the salts, which salts can be subsequently removed by a leaching of these water soluble salts during subsequent stages of catalyst production.

From slurry tank 18 the hydrogel is removed to be separated from the slurry medium in conventional vacuum rotary filters, not shown. As dewatered particles, the hydrogel is then introduced into a conventional rotary drier 20 wherein the spheroidal particles are partially dried to a volatile content of between 30 to 45 percent, as determined at 1800° F., which degree of drying will result in a catalyst product having a particle density of about 0.9 to 1.0. To demonstrate how important the step of partial drying is in fixing particle density in the finished catalyst, spheroidal particles were subjected to various degrees of drying, as represented by weight loss during drying. The results of that drying are tabulated as follows:

*Table II*

SAMPLE NO. 1

| Approx. Percent Loss of Weight | Percent Volatile at 1,800° F. | Cl⁻ Titration per 0.25 gm. Partially Dried Material (cc. 0.1 N AgNO₃) | Slurry pH (2 Parts H₂O to 1 part Spheroids) | Finished Product Particle Density |
| --- | --- | --- | --- | --- |
| 76.8 | 44.0 | 18.4 | 3.9 | 1.14 |
| 79.6 | 39.8 | 20.0 | 3.95 | 1.14 |
| 79.4 | 38.6 | 21.6 | 4.00 | 1.10 |
| 80.3 | 34.3 | 21.6 | 4.00 | 1.08 |
| 81.4 | 30.6 | 21.6 | 5.00 | 1.07 |
| 82.0 | 29.7 | 20.7 | 6.33 | 1.06 |
| 82.3 | 29.0 | 20.9 | 6.62 | 1.04 |
| ---- | 28.2 | 19.4 | 7.22 | 1.11 |
| 83.2 | 25.7 | 18.7 | 7.40 | 1.13 |

SAMPLE NO. 2

| | | | | |
| --- | --- | --- | --- | --- |
| 72.7 | 52.45 | 19.0 | 3.72 | 1.15 |
| 78.5 | 40.37 | 22.0 | 3.80 | 1.04 |
| 79.79 | 35.39 | 23.0 | 5.63 | 1.01 |
| 80.58 | 33.41 | 22.3 | 6.70 | 1.01 |
| 81.29 | 29.73 | 22.6 | 7.22 | 1.02 |
| 82.91 | 23.58 | 20.9 | 7.88 | 1.08 |

Under the particular circumstances these samples did not go below a density of 1.0, because, as the tabulated results indicate, the particle density of the finished product gradually decreases, reaches a minimum, and then shows a sharp increase. However, as was earlier indicated, by operating at a higher pH in the slurry tank or by increasing the salt content of the gel prior to the step of partial drying, final product densities of 1.0 or below can be obtained with a volatile content in the partially dried material of 30 to 45 percent.

The remainder of the diagrammatic flow sheet of Fig. 1 schematically portrays the essential conclusion of the process of catalyst production from furnace slag and the like. This portion of the process is contained in the aforementioned copending application and is only cursorily considered here since it is not materially related to the problem of density reduction to which this invention pertains. From drier 20 the partially dried particles may be subjected to iron removal treatment by various reducing agents in tank 22. The thus treated gel cake is then subjected to water washing using deionized water with particular emphasis being placed on decationization, so that no interfering cations will be introduced into the system. Following this thorough water washing in wash tank 24, the free surface water is removed in rotary filter 26 and returned to the system at various points such as slurry tank 18 in which the water is suitable for use as a slurry medium. The dewatered gel is then dried in dryer 28 to a finished particulate catalyst containing 5 to 6 percent volatile at 1800° F.

What is claimed is:

1. A method of producing a microspheroidal synthetic oxide gel having a particle density of about 0.9 to 1.0 which comprises collecting a newly coagulated microspheroidal silica-alumina gel in an aqueous solution of water-soluble salts selected from the group consisting of magnesium chloride, calcium chloride and ammonium chloride, said salts being present in amounts providing 2.2 to 2.3 milliequivalents of chloride ion per cubic centimeter of solution, said aqueous solution having a pH of about 3.0 to 6.0, partially drying the thus treated gel to a volatile content of about 30 to 45 percent as determined by heating at 1800° F. to fix said salts within the gel structure, water-washing the partially dried gel to remove said salts therefrom, and drying the washed gel.

2. A method of producing a microspheroidal synthetic oxide gel having a particle density of about 0.9 to 1.0 which comprises collecting a newly coagulated microspheroidal silica-alumina gel in an aqueous solution of water-soluble salts selected from the group consisting of magnesium chloride, calcium chloride and ammonium chloride, said salts being present in amounts providing 2.2 to 2.3 milliequivalents of chloride ion per cubic centimeter of solution, said aqueous solution having a pH about 4.3 to 4.8, partially drying the thus treated gel to a volatile content of about 30 to 45 percent as determined by heating at 1800° F. to fix said salts within the gel structure, and water washing the partially dried gel to remove said salts from the gel.

3. A method of producing a microspheroidal synthetic oxide gel having a particle density of about 0.9 to 1.0 which comprises collecting a newly coagulated microspheroidal silica-alumina gel in an aqueous solution of water-soluble salts selected from the group consisting of magnesium chloride, calcium chloride and ammonium chloride, said salts being present in amounts providing 2.2 to 2.3 milliequivalents of chloride ion per cubic centimeter of solution, said aqueous solution having a pH about 4.3 to 4.8, partially drying the thus treated gel to a volatile content of about 30 to 45 percent as determined by heating at 1800° F. to fix said salts within the gel structure, water washing the partially dried gel to remove said salts from the gel, and removing water from the washed gel structure.

4. A method according to claim 3 in which the step of removing water from the washed gel structure comprises drying said gel structure.

References Cited in the file of this patent
UNITED STATES PATENTS

| | | |
|---|---|---|
| 2,085,129 | Stoewener | June 29, 1937 |
| 2,499,680 | Plank | Mar. 7, 1950 |
| 2,568,352 | Milligan | Sept. 18, 1951 |
| 2,669,547 | Shabaker | Feb. 16, 1954 |
| 2,689,226 | Hoekstra | Sept. 14, 1954 |